(12) United States Patent
Khalid

(10) Patent No.: US 12,402,028 B2
(45) Date of Patent: Aug. 26, 2025

(54) HIERARCHICAL NETWORK WITH LOWER-LEVEL SWITCHED TRAFFIC

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 548 days.

(21) Appl. No.: 17/808,171

(22) Filed: Jun. 22, 2022

(65) Prior Publication Data

US 2023/0422077 A1    Dec. 28, 2023

(51) Int. Cl.
*H04W 28/02* (2009.01)
*H04W 84/12* (2009.01)

(52) U.S. Cl.
CPC ........ *H04W 28/0231* (2013.01); *H04W 84/12* (2013.01)

(58) Field of Classification Search
CPC ............. H04W 28/0231; H04W 84/12; H04W 56/001; H04W 24/08; H04W 68/005; H04W 76/12; H04L 25/03019; H04L 47/24; H04L 47/826; H04L 47/83; H04L 45/70; H04L 43/0852; H04L 12/00
See application file for complete search history.

(56) References Cited

U.S. PATENT DOCUMENTS

| | | | |
|---|---|---|---|
| 11,646,935 B1* | 5/2023 | Khalid | H04L 45/586 709/226 |
| 2010/0208741 A1* | 8/2010 | Vasseur | H04L 45/02 370/400 |
| 2013/0242976 A1* | 9/2013 | Katayama | H04L 45/40 370/350 |
| 2019/0335405 A1* | 10/2019 | Wang | H04L 25/03019 |

* cited by examiner

*Primary Examiner* — Dady Chery
(74) *Attorney, Agent, or Firm* — Mendelsohn Dunleavy, P.C.; Steve Mendelsohn

(57) ABSTRACT

In a hierarchical communication network having a network controller at a highest network level and network devices at one or more lower network levels, where each network device at a lowest network level supports communications with one or more end nodes, the network controller supports an initial phase of a communication session between first and second end nodes, where communication signals transmitted from the first end node to the second end node traverse the network controller; determines that a subsequent phase of the communication session can be supported by a particular lower-level network device; and configures the lower-level network device to support the subsequent phase, wherein communication signals transmitted from the first end node to the second end node do not traverse the network controller, thereby potentially reducing the processing and/or memory requirements for the WLAN controller, WLAN controller and/or link costs, and/or latency and delay levels.

24 Claims, 5 Drawing Sheets

HIERARCHICAL NETWORK WITH LOWER-LEVEL SWITCHED TRAFFIC

BACKGROUND

Field of the Disclosure

The present disclosure relates to hierarchical communication networks and, more specifically but not exclusively, to techniques for improving quality of service (QoS) and reducing latency in hierarchical SDN/VNF-based networks.

Description of the Related Art

This section introduces aspects that may help facilitate a better understanding of the disclosure. Accordingly, the statements of this section are to be read in this light and are not to be understood as admissions about what is prior art or what is not prior art.

A conventional wireless local area network (WLAN) has a WLAN controller (WLC) and a number of end nodes (aka terminal devices) that may communicate with one another via the WLAN. Depending on the particular architecture of the WLAN, there may be one or more levels of network devices such as routers, switches, and/or access points (APs) located between the WLAN controller and the end nodes. In one possible architecture, just below the WLAN controller is a (e.g., mesh network) level of routers, just below the router level is a level of switches, just below the level of switches is a level of APs, each of which communicates wirelessly with one or more end nodes.

According to the prior art, whenever two end nodes of the WLAN communicate with one another, the communication signals (e.g., packets) from one end node are transmitted to the AP currently handling communications with that end node, from that AP to the switch configured to handle communications with that AP, and from that switch through one or more routers forming a path through the mesh network to the WLAN controller, which then examines the destination and home addresses of the packets to transmit those packets to the other end node via another path through the mesh network and via the (same or different) switch and the (same or different) AP currently handling communications with that other end node.

This situation applies to all communications between different end nodes of the WLAN. As a result, the WLAN controller must be provisioned with sufficient processing and memory resources and high-bandwidth links to handle expected peak loads of WLAN traffic, which can result in significantly expensive WLAN controller and link implementations. Furthermore, if the WLAN controller is located far from the end nodes, then undesirable levels of latency and delay can occur in those communications. Elephant flows (e.g., large file transfers and bulk data transfers) can also result in high levels of latency and delay. Implementing multiple WLAN controllers closer to the end nodes also increases the cost.

SUMMARY

Problems in the prior art are addressed in accordance with the principles of the present disclosure by enabling a WLAN controller to employ software-defined network (SDN) and network function virtualization (NFV) technologies to program network devices, such as, for example, routers, switches, and access points, to function as sub-network controllers that can perform certain subsets of the WLC functions (e.g., packet inspection for certain types of packets or on certain routes and routing decisions) closer to end nodes. In particular, if a particular network device (e.g., router, switch, or AP) is the highest common network device for two end nodes and if that network device currently has sufficient unused processing and memory resources, then the WLAN controller can program that network device to function as an SDN sub-network controller for handling communications between those two end nodes without having the corresponding communication signals traverse the WLAN controller (or any other network devices above that network device in the WLAN hierarchy). In essence, the WLAN controller determines what WLC functions to delegate and to what network device these WLC functions will be delegated. This delegation is based not only on the capabilities of the network device but also on the service level agreement to be met for the customer(s) for QoS traffic. In this way, a significant fraction of the WLAN traffic load may be supported without having to traverse the WLAN controller, thereby potentially reducing the processing and/or memory requirements for the WLAN controller and, as a result, reducing its cost. In addition, certain upper-level link costs may also be reduced due to lower bandwidth requirements resulting from offloading traffic to lower-level links. Latency and delay levels may also be reduced. These WLC functions are dynamically created and removed when not needed to free up resources.

In one embodiment, the present disclosure is a network controller for a hierarchical communication network having the network controller at a highest network level and a plurality of network devices at one or more lower network levels, wherein each network device at a lowest network level is configured to support communications with one or more end nodes. The network controller comprises a processor and a memory configured to store data for the processor. The processor is configured such that the network controller supports an initial phase of a communication session between first and second end nodes of the network, wherein, for the initial phase, communication signals transmitted from the first end node to the second end node traverse the network controller; determines that a subsequent phase of the communication session can be supported by a particular lower-level network device; and configures the lower-level network device to support the subsequent phase such that, for the subsequent phase, communication signals transmitted from the first end node to the second end node do not traverse the network controller.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
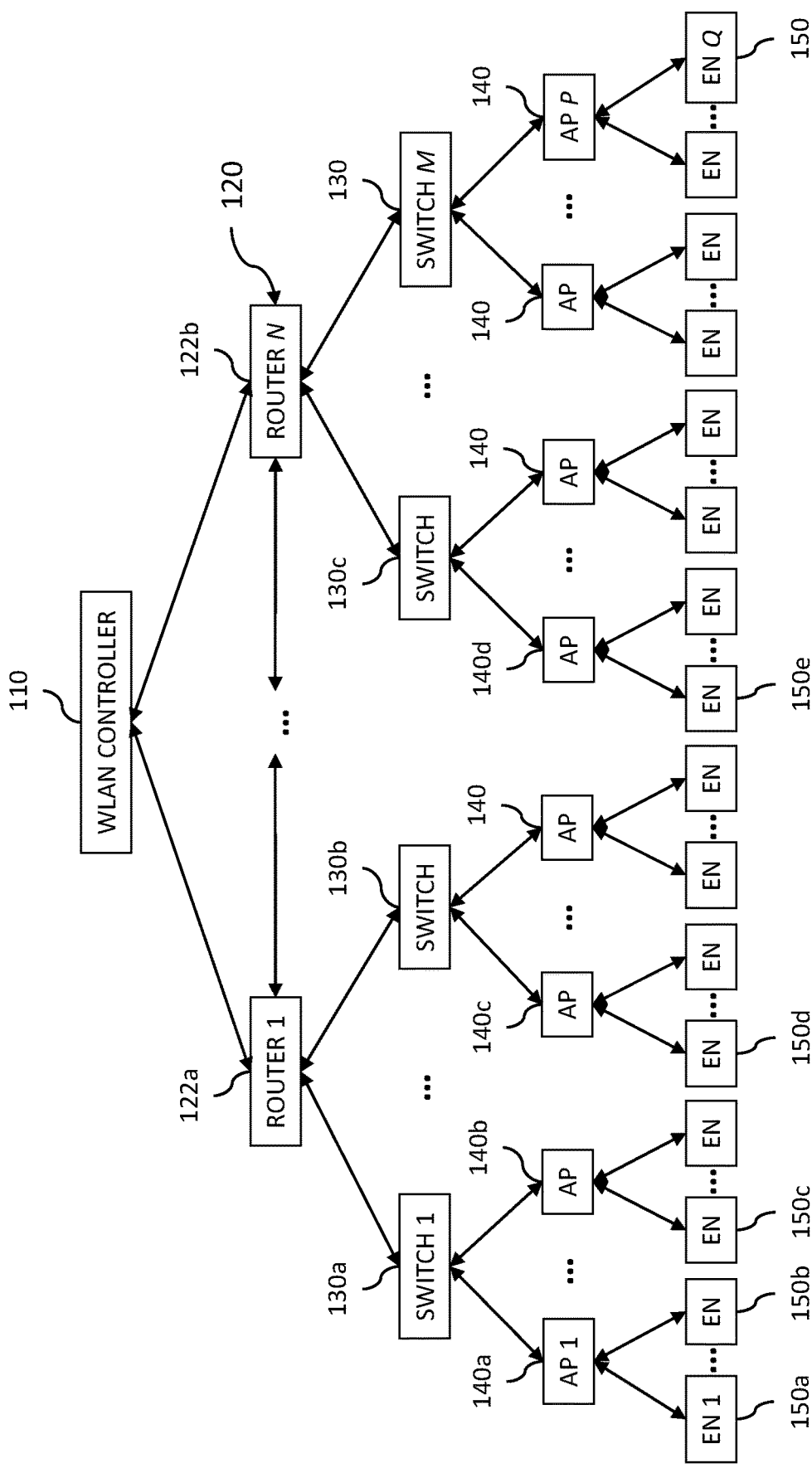
FIG. 1 is a block diagram of a WLAN according to certain embodiments of the disclosure.

FIG. 1 is a block diagram of a WLAN 100 according to certain embodiments of the disclosure. As shown in FIG. 1, the WLAN 100 is a hierarchical (i.e., multiple-level) network comprising a WLAN controller (WLC) 110 at the top level, a mesh network 120 of N routers 122 at the next level down, a level of M switches 130 at the next level down, a level of P access points (APs) at the next level down, and a set of Q end nodes (ENs) 150 at the bottom level, where N, M, P, and Q are integers. The WLAN controller 110 can communicate with the N routers 122, which may also be configured to communicate with one another to form communication paths through the mesh network 120. Each switch 130 is configured to communicate with at least one router 122 and one or more APs 140, each of which is further configured to handle wireless communications with one or more end nodes 150. Depending on the particular implementation, each of the WLAN controller 110, routers 122, switches 130, and APs 140 may communicate with one or more other network devices via wireless, wired, and/or optical links.

The WLAN controller 110 has knowledge of the topology of the WLAN 100 as well as knowledge of the configurations and capabilities (including amounts of currently unused processing and memory resources) of the different network devices within the WLAN 100. With knowledge of the entire WLAN 100, the WLAN controller 110 can identify quality of service (QoS) requirements and overall traffic for different sub-networks (i.e., different interconnected subsets of the network devices 122/130/140 and end nodes 150 in the WLAN 100) and network flows within those sub-networks.

According to the prior art, whenever two end nodes 150 within the WLAN 100 communicate, their communication signals traverse from one end node up through all of the intermediate levels to the WLAN controller 110 and then from the WLAN controller 110 back down through all of the intermediate levels to the other end node.

According to certain embodiments of the disclosure, however, the WLAN controller 110 is able to program one or more network devices (e.g., using the NETCONF protocol) to function as one or more sub-network controllers for one or more portions of the WLAN 100, wherein some of the end-node-to-end-node network traffic is handled by those one or more sub-network controllers such that the communication signals for that portion of the network traffic does not traverse the WLAN controller 110. The WLAN controller uses SDN technology to determine which network devices to program as sub-network controllers and NFV technology to create those sub-network controllers. In order to reduce latency and implementation costs, the SDN sub-network controllers should be implemented as close to the relevant end nodes as possible.

For example, for communications between end node 150a and end node 150b of FIG. 1, AP 140a is the lowest network device that is common to those two end nodes 150a and 150b. If the WLAN controller 110 knows that AP 140a currently has sufficient unused processing and memory resources, then the WLAN controller 110 can program AP 140a to function as an SDN sub-network controller for handling communications between end nodes 150a and 150b without having the corresponding communication signals traverse the WLAN controller 110 (or any switch 130 or router 122). In that case, AP 140a receives communication signals from end node 150a and forwards those communication signals to end node 150b without involving any higher-level network devices. Note that, concurrently and/or consecutively, AP 140a can also function as an SDN sub-network controller for handling communications between other pairs of end nodes 150 that have AP 140a in common. If and when the WLAN controller 110 determines that AP 140a is no longer needed to function as a sub-network controller, the WLAN controller 110 can reprogram AP 140a to cease functioning as a sub-network controller, thereby freeing up the associated processing and memory resources for normal AP operations.

Note that, if AP 140a does not currently have sufficient unused processing and/or memory resources to function as an SDN sub-network controller, but switch 130a does, then the WLAN controller 110 can program switch 130a to function as an SDN sub-network controller for handling communications between end nodes 150a and 150b. Similarly, if neither AP 140a nor switch 130a currently has sufficient unused processing and/or memory resources to function as an SDN sub-network controller, but router 122a does, then the WLAN controller 110 can program router 122a to function as an SDN sub-network controller for handling communications between end nodes 150a and 150b.

As another example, for communications between end node 150a and end node 150c of FIG. 1, switch 130a is the lowest network device that is common to those two end nodes 150a and 150c. If the WLAN controller 110 knows that switch 130a currently has sufficient unused processing and memory resources, then the WLAN controller 110 can program switch 130a to function as an SDN sub-network controller for handling communications between end nodes 150a and 150c without having the corresponding communication signals traverse the WLAN controller 110 (or any router 122). In that case, switch 130a receives communication signals from end node 150a via AP 140a and forwards those communication signals to end node 150c via AP 140b without involving any higher-level network devices. Note that, concurrently and/or consecutively, switch 130a can also function as an SDN sub-network controller for handling communications between other pairs of end nodes 150 that have switch 130a in common. If and when the WLAN controller 110 determines that switch 130a is no longer needed to function as a sub-network controller, the WLAN controller 110 can reprogram switch 130a to cease functioning as a sub-network controller, thereby freeing up the associated processing and memory resources for normal switch operations.

Note that, if switch 130a does not currently have sufficient unused processing and/or memory resources to function as an SDN sub-network controller, but router 122a does, then the WLAN controller 110 can program router 122a to function as an SDN sub-network controller for handling communications between end nodes 150a and 150c.

As yet another example, for communications between end node 150a and end node 150d of FIG. 1, router 122a is the lowest network device that is common to those two end nodes 150a and 150d. If the WLAN controller 110 knows that router 122a currently has sufficient unused processing and memory resources, then the WLAN controller 110 can program router 122a to function as an SDN sub-network controller for handling communications between end nodes 150a and 150d without having the corresponding communication signals traverse the WLAN controller 110. In that case, router 122a receives communication signals from end node 150a via AP 140a and switch 130a and forwards those communication signals to end node 150d via switch 130b and AP 140c without involving the WLAN controller 110. Note that, concurrently and/or consecutively, router 122a can also function as an SDN sub-network controller for handling communications between other pairs of end nodes 150 that have router 122a in common. If and when the WLAN controller 110 determines that router 122a is no longer needed to function as a sub-network controller, the WLAN controller 110 can reprogram router 122a to cease functioning as a sub-network controller, thereby freeing up the associated processing and memory resources for normal router operations.

The need for an SDN sub-network controller may be based on what type of traffic is going through the network. For example, if the traffic does not need prioritization, then SDN sub-network controllers might not be needed. For QOS, voice traffic, etc., one or more SDN sub-network controllers may be needed depending on the traffic and the latency requirements.

For example, if one section of the network that is already loaded with traffic suddenly has gamers with a certain demand of latency, then, in order to meet the QOS demands (e.g., maximum latency) of the customers, one or more SDN sub-network controllers may need to be implemented close to the gamers to reduce latency of gaming traffic. The existence of the gaming traffic may be determined from QoS tags associated with the traffic.

In some implementations, a learning network element (e.g., AI/ML 220d of FIG. 3) will learn from patterns and adjust in the future. For example, if a certain traffic is often observed on a particular network section, then the corresponding SDN sub-network controller may be retained for a longer term, thereby avoiding the repeated programming and deprogramming of the corresponding network device as an SDN sub-network controller.

On the other hand, for example, for communications between end node 150a and end node 150e of FIG. 1, the WLAN controller 110 may be the lowest network device that is common to those two end nodes 150a and 150e. In that case, as in the prior art, the WLAN controller 110 will function as the controller for those communications.

Figure 2:
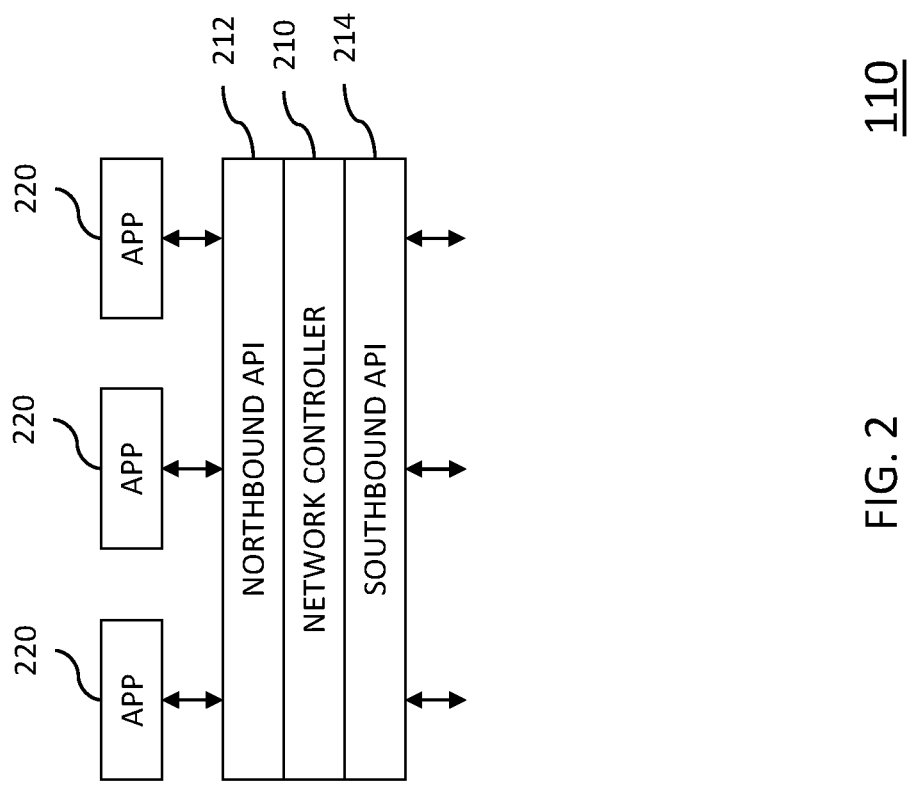
FIG. 2 is a block diagram representing the generic software architecture of the WLAN controller of FIG. 1, according to certain embodiments.

FIG. 2 is a block diagram representing the generic software architecture of the WLAN controller 110 of FIG. 1, according to certain embodiments. As shown in FIG. 2, the WLAN controller 110 has a network controller 210 that communicates with one or more applications (apps) 220 via a northbound application programming interface (API) 212 and with lower-level network devices (e.g., routers 122 of FIG. 1) via a southbound API 214. Note that the northbound API 212 may be used for all communications with higher-layer/higher-level elements, while the southbound API 214 may be used for all communications with lower-layer/lower-level elements.

The network controller 210 is able to monitor QoS and latency requirements of local flows that do not need to traverse the WLAN controller 110 and learn about such local flows for future handling of subsequent similar local flows. The network controller 210 is assisted by the apps 220 (e.g., apps 220a-220d of FIG. 3).

Figure 3:
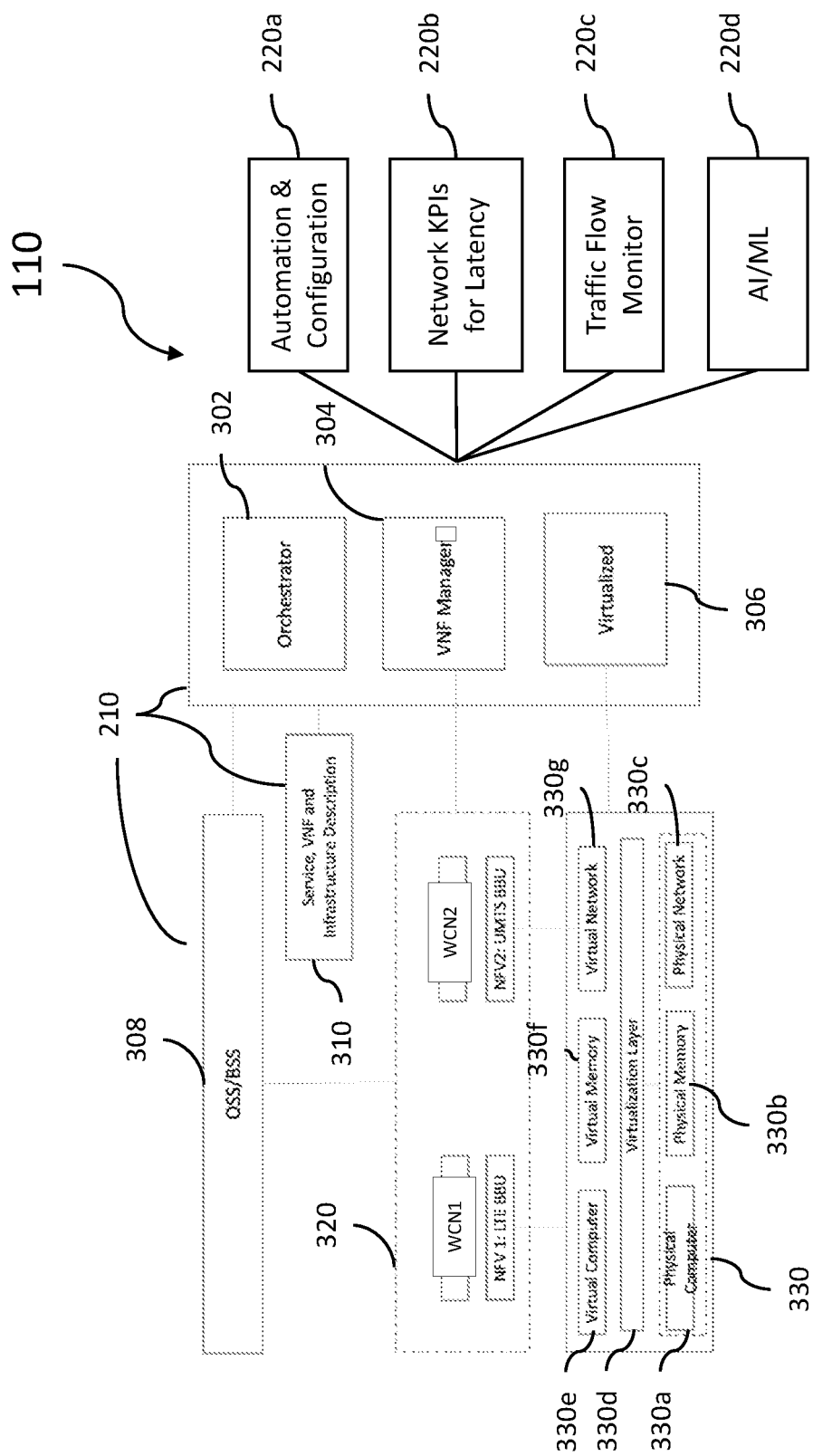
FIG. 3 is a block diagram representing the specific software architecture of the WLAN controller of FIG. 1, according to certain implementations of the generic software architecture of FIG. 2.

FIG. 3 is a block diagram representing the virtual network function (VNF) architecture of the WLAN controller 110 of FIG. 1, according to certain implementations of the generic software architecture of FIG. 2. As shown in FIG. 3, the network controller 210 of FIG. 2 implements software elements 302-310, and software elements 220a-220d are four apps 220 of FIG. 2, where:

Orchestrator 302 performs the programming (and de-programming) of network devices to function as SDN sub-network controllers. The orchestrator 302 is consulted when a new network function is being introduced, for example, a new load balancer or another function in the network. For example, a new virtual private network (VPN), private segment, etc. or even routing and switching functions;

Virtual network function (VNF) manager 304 determines which network devices are to be programmed as new SDN sub-network controllers and for how long and which existing SDN sub-network controllers are to be de-programmed;

Virtualized module 306 monitors the virtualized resources (i.e., the existing SDN sub-network controllers) in general and when they are freed up, etc.;

Operations support system (OSS)/business support system (BSS) 308 collects data for the network, for example, key performing indicators (KPIs) and implements configuration management (CM) to configure the network (CM), performance management (PM) to monitor and assess network performance, and fault management (FM) to monitor alarms to identify network problems. All of this data is helpful in understanding how the network is getting loaded and what types of traffic are flowing in the network;

Service, VNF, and infrastructure description 310 stores the architecture of the overall network infrastructure for each given service and network slice. A given network may have various slices (i.e., segments) and services, for example, fixed wireless, mobile services, Internet of Things (IoT), etc.

Automation & configuration (A&C) app 220a helps in putting together commands for the network to configure a network segment. The A&C app 220a is consulted in the event the VNF manager 304 finds optimum settings, flows, and/or network devices to change the network segment, e.g., reconfigure the network segment for changing (dynamic) traffic flow. The A&C app 220A provides the settings.

Network key performance indicators (KPIs) for latency 220b are selected based on network performance, for example, data usage in downlink and uplink, latency requirements, QoS flows, and meeting service level agreements, etc., at a high level.

Traffic flow monitor 220c is a central application/function that monitors all the nodes and collects information that will be used by the VNF manager 304.

Artificial intelligence/machine learning (AI/ML) 220d communicates with OSS/BSS 308 and analyzes QoS traffic in different segments of the network to determine patterns for different types of traffic (e.g., gaming, residential, business) and then use this information to control future programming and de-programming of network devices as SDN sub-network controllers. AI/ML 220d provides information that the VNF manager 304 uses to determine how long to maintain a network device as an SDN sub-network controller.

In addition, block 320 indicates the existence of two different wireless core networks WCN1 and WCN2 having two different technologies, where WCN1 includes NFV1: Long Term Evolution (LTE) baseband unit (BBU) and WCN2 includes NFV2: Universal Mobile Telecommunications Service (UMTS) BBU. Usually the wireless nodes are controlled by means of a BBU, e.g., antenna systems on a tower and baseband units at the base of the tower. This is an example to emphasize that the present disclosure applies to wireless systems with multiple technologies.

Block 330 represents an example network device having physical elements (e.g., physical computer 330a, physical memory 330b, and physical network connections 330c) and a virtualization layer 330d that creates the virtual elements (e.g., virtual computer 330e, virtual memory 330f, and virtual network connections 330g) of an SDN sub-network controller implemented using the physical elements of that network device. These physical resources are logically mapped to different technology elements as needed. When these resources are not needed, they are returned to the resource pool.

The VNF manager 304 gathers network information (e.g., the network topology, available resources (e.g., memory, CPU, and eligibility), and packet QoS requirements) and determines what changes to make to the network and when and where depending on, for example, whether a network segment is heavily loaded and needs load balancing. If so, the VNF manager 304 introduces a load balancer and configures the settings based on the OEMs involved in that network segment. The VNF manager 304 needs a lot of information as well as education on when and how to configure network devices and functions, etc. The VNF manager 304 will get this information from applications such as a latency monitor (extracted from OSS/BSS 308). A traffic flow monitor comes from various sources such as the network device itself or via port monitors configured at various network segments, etc.

At a high level, the AI/ML 220d learns about customer habits. It can categorize customers into various categories based on their subscriptions (e.g., gamer, work from home, high elephant load, streamer, etc.) by determining trends and then categorizing each customer into a customer category at the network level, then at a local level, and eventually at the individual level. This is to determine the length of time the SDN sub-network controller will be in place. For example, for a group of users in a given segment, if the AI/ML 220d determines that gamers are present, then it will implement an SDN sub-network controller at an appropriate level. If, for example, the AI/ML 220d determines from habits that the gamers are online every day from 4 PM-11 PM, it can maintain the SDN sub-network controller during that time period. If a gaming user comes online with a specific demand of QoS, then an SDN sub-network controller can be implemented for a short period of time and the duration will be monitored. If it is only a one-time event, then the SDN sub-network controller may be retained for an hour with its lease getting renewed every hour, as needed. If there is a consistent pattern, then the lease can be extended appropriately based on what similar users do. If the user is not consistent, then the lease will expire and the corresponding resources will be freed up.

According to certain implementations, a new communication session between two end nodes 150 of FIG. 1 is initiated in the same manner as in the prior art such that, for an initial phase of this new communication session, the communication signals between the two end nodes 150 traverse the WLAN controller 110 and all intermediate levels of the WLAN 100. For example, each packet from the source end node 150 is routed all the way to the WLAN controller 110 before it is routed to the destination end node 150.

If the WLAN controller 110 determines that there is a lowest common network device that currently has sufficient unused processing and memory resources, then, if that network device is not already programmed as such, the WLAN controller 110 can program that network device to function as an SDN sub-network controller for the new communication session. If the network device is already programmed to function as an SDN sub-network controller for a subset of the end nodes 150 containing those two end nodes, then the WLAN controller can assign the new communication session to that SDN sub-network controller. In either case, the WLAN controller 110 assigns the handling of a subsequent phase of the new communication session to that SDN sub-network controller such that the communication signals for that subsequent phase traverse that corresponding programmed network device, but not the WLAN controller 110.

Figure 4:
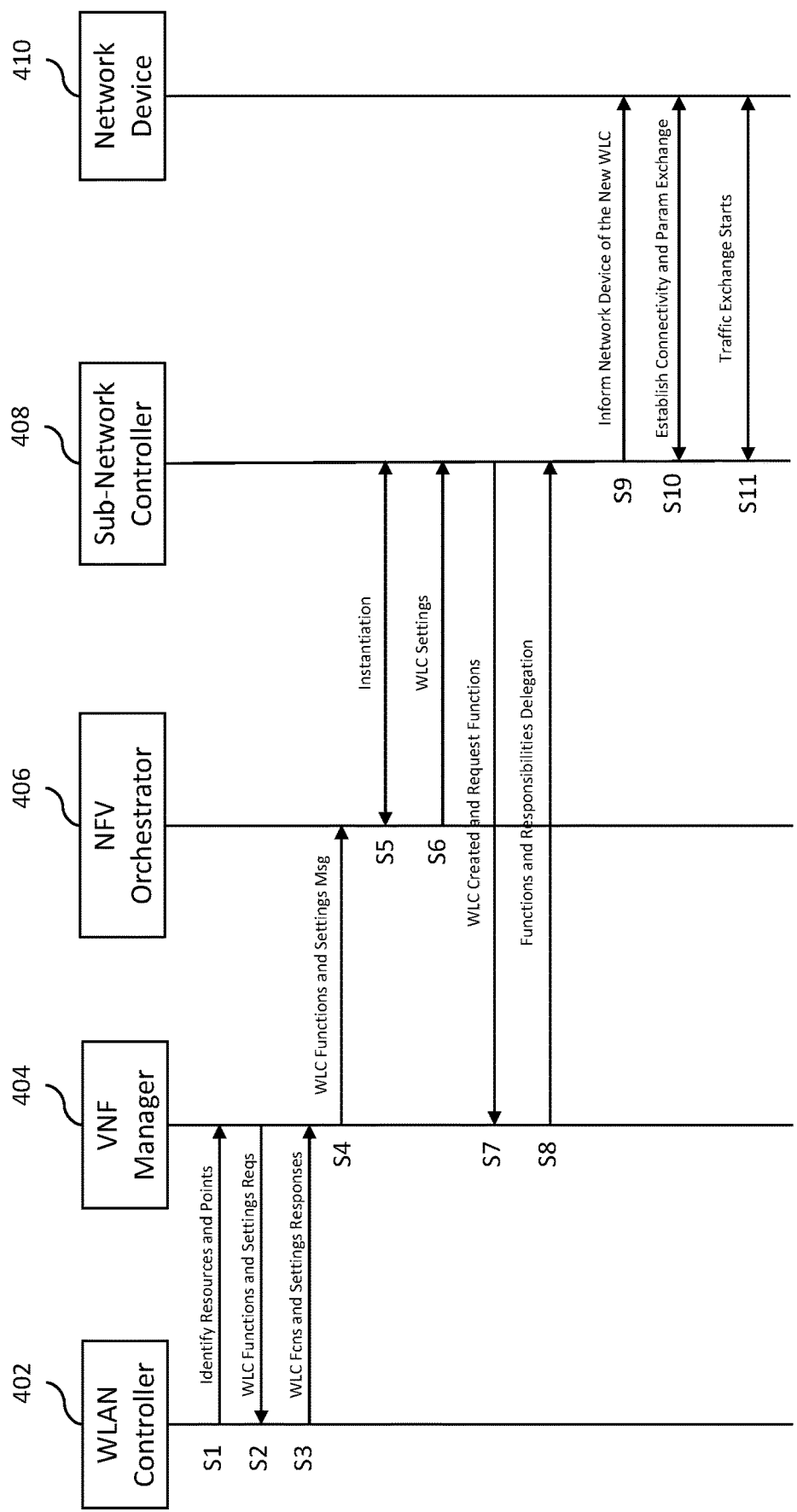
FIG. 4 is a signal flow diagram representing the sequence of messaging within the WLAN of FIG. 1 to program one of the network devices to function as a sub-network controller.

FIG. 4 is a signal flow diagram representing the sequence of messaging within the WLAN 100 of FIG. 1 to program one of the network devices to function as a sub-network controller. In FIG. 4, WLAN controller 402 represents the WLC functionality of a conventional WLAN controller, such as routing and inspecting packets. VNF manager 404 and NFV orchestrator 406 correspond to VNF manager 304 and orchestrator 302 of FIG. 3, respectively. Sub-network controller 408 corresponds to a network device that has been configured by the WLAN controller 110 of FIG. 1 to function as a sub-network controller, and network device 410 represents one of the lower-level network devices that is impacted by the existence of the sub-network controller 408. The messages shown in FIG. 4 can be run on various existing protocols such as NETCONF for device configuration and SDN/VNF standard protocols to define sub-network controller functions on a given network device.

In step S1, the WLAN controller 402 identifies resources and points (i.e., the overall topology of the network as shown in FIG. 1) to the VNF manager 404 based on information gathered by the WLAN controller 402 from various sources.

In step S2, the VNF manager 404 requests WLC functions (e.g., packet inspection, end points, IP route, etc.) and settings from the WLAN controller 402 corresponding to the SDN sub-network controller to be implemented.

In step S3, the WLAN controller 402 responds by transmitting the WLC functions and settings to the VNF manager 404.

In step S4, the VNF manager 404 transmits the WLC functions and settings to the NFV orchestrator 406 so that the NFV orchestrator 406 can implement the settings based on the changes it has finalized.

In step S5, the NFV orchestrator 406 creates an instance of the sub-network controller 408. This is the handshake needed with the network device before the settings are pushed that create the SDN sub-network controller.

In step S6, the NFV orchestrator 406 transmits the WLC functions to the sub-network controller 408 to reserve resources (e.g., memory, computing load) at the network device. This is the handshake needed to establish connectivity with the sub-network controller 408.

In step S7, the sub-network controller 408 (i) transmits to the VNF manager 404 an acknowledgement that the sub-network controller 408 has been created and (ii) requests functions (e.g., packet inspection, end point transfer of packets, etc.).

In step S8, the VNF manager 404 delegates functions and responsibilities to the sub-network controller 408.

In step S9, the sub-network controller 408 informs the corresponding network device 410 about the existence of the sub-network controller 408 for a particular flow.

In step S10, the sub-network controller 408 and the network device 410 establish connectivity and exchange parameters via handshakes to complete the connectivity between the new SDN sub-network controller 408 and lower-level network devices.

In step S11, the exchange of traffic between the sub-network controller 408 and the lower-level network device 410 begins. This involves forwarding communication signals received by the network device 410 from one end node 150 to the sub-network controller 408, which then forwards the communication signals back to the network device 410 for transmission to the other end node 150 without involving the WLAN controller 110 or any other high-level network devices.

Figure 5:
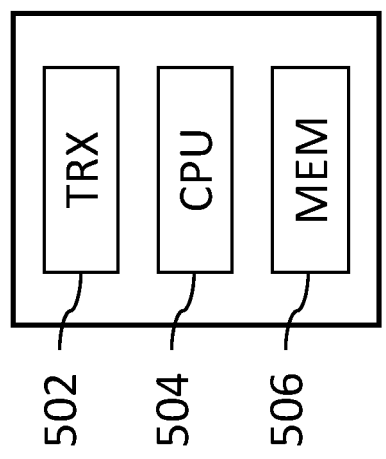
FIG. 5 is a simplified hardware block diagram of an example node that can be used to implement the WLAN controller of FIG. 1.

FIG. 5 is a simplified hardware block diagram of an example node 500 that can be used to implement the WLAN controller 110 of FIG. 1. As shown in FIG. 5, the node 500 includes (i) communication hardware (e.g., wireless, wireline, and/or optical transceivers (TRX)) 502 that supports communications with other nodes, (ii) a processor (e.g., CPU microprocessor) 504 that controls the operations of the node 500, and (iii) a memory 506 that stores code executed by the processor 504 and/or data generated and/or received by the node 500. Those skilled in the art that memory 506 may include both short-term storage (e.g., RAM) for frequently used data/configuration and long-term storage (e.g., ROM) for some data/configuration that is not often used. Note that any of the network devices of FIG. 1 may be implemented using analogous configurations of communication hardware, processors, and memories.

Although embodiments have been described in the context of WLAN 100 of FIG. 1, those skilled in the art will understand that the technology of the present disclosure can be applied in other types of hierarchical networks and in hierarchical networks having different numbers of levels, including (without limitation) wired and optical communication networks and other wireless communication networks having base stations such as 3rd Generation Partnership Project (3GPP) networks such as 4G Long-Term Evolution (LTE) and 5G New Radio (NR) networks having Citizens Broadband Radio Service (CBRS) base stations (aka CBSDs), including NR base stations having central units (CUs) and distributed units (DUs).

In certain embodiments, the present disclosure is a network controller for a hierarchical communication network having the network controller at a highest network level and a plurality of network devices at one or more lower network levels, wherein each network device at a lowest network level is configured to support communications with one or more end nodes. The network controller comprises a processor and a memory configured to store data for the processor. The processor is configured such that the network controller supports an initial phase of a communication session between first and second end nodes of the network, wherein, for the initial phase, communication signals transmitted from the first end node to the second end node traverse the network controller; determines that a subsequent phase of the communication session can be supported by a particular lower-level network device; and configures the lower-level network device to support the subsequent phase such that, for the subsequent phase, communication signals transmitted from the first end node to the second end node do not traverse the network controller.

In at least some of the above embodiments, the network controller configures the particular lower-level network device to function as a software-defined networking (SDN) sub-network controller supporting the subsequent phase of the communication session.

In at least some of the above embodiments, the particular lower-level network device is a router, switch, access point, or base station of the network that has sufficient unused processing and memory resources to function as the SDN sub-network controller in addition to performing its respective router, switch, access point, base station functionality.

In at least some of the above embodiments, the network controller subsequently re-configures the particular lower-level network device to cease functioning as the SDN sub-network controller.

In at least some of the above embodiments, the network controller takes into account one or more past and/or present communication sessions supported by the particular lower-level network device to determine when to re-configure the particular lower-level network device to cease functioning as the SDN sub-network controller.

In at least some of the above embodiments, the network controller will not re-configure the particular lower-level network device to cease functioning as the SDN sub-network controller until after the network controller receives, from the particular lower-level network device, notice of termination of the communication session.

In at least some of the above embodiments, the network controller learns about flows and traffic patterns in the network to (i) select the particular lower-level network device to perform sub-controller functionality and (ii) determine a duration for the particular lower-level network device to perform sub-controller functionality.

In at least some of the above embodiments, the network controller performs artificial intelligence and/or machine learning to perform the learning, selection, and determination.

In at least some of the above embodiments, the network controller selects the particular lower-level network device as the lowest-level network device that can support the communication session.

In at least some of the above embodiments, in selecting the particular lower-level network device, the network controller takes into account one or more of (i) quality of service (QoS) requirements, (ii) link congestion, (iii) link cost, or (iv) network policy for the communication session.

In at least some of the above embodiments, the network controller performs network function virtualization (NFV) functionality to determine that the subsequent phase of the communication session can be supported by the particular lower-level network device.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein, the phrases "at least one of A and B" and "at least one of A or B" are both to be interpreted to have the same meaning, encompassing the following three possibilities: 1—only A; 2—only B; 3—both A and B.

What is claimed is:

1. A network controller for a hierarchical communication network having the network controller at a highest network level and a plurality of network devices at one or more lower network levels, wherein each network device at a lowest network level is configured to support communications with one or more end nodes, the network controller comprising a processor and a memory configured to store data for the processor, wherein the processor is configured such that the network controller:

supports an initial phase of a communication session between first and second end nodes of the network, wherein, for the initial phase, communication signals transmitted from the first end node to the second end node traverse the network controller;

determines that a subsequent phase of the communication session can be supported by a particular lower-level network device; and configures the lower-level network device to support the subsequent phase such that, for the subsequent phase, communication signals transmitted from the first end node to the second end node do not traverse the network controller.

2. The network controller of claim 1, wherein the network controller configures the particular lower-level network device to function as a software-defined networking (SDN) sub-network controller supporting the subsequent phase of the communication session.

3. The network controller of claim 2, wherein the particular lower-level network device is a router, switch, access point, or base station of the network that has sufficient unused processing and memory resources to function as the SDN sub-network controller in addition to performing its respective router, switch, access point, or base station functionality.

4. The network controller of claim 2, wherein the network controller subsequently re-configures the particular lower-level network device to cease functioning as the SDN sub-network controller.

5. The network controller of claim 4, wherein the network controller takes into account one or more past and/or present communication sessions supported by the particular lower-level network device to determine when to re-configure the particular lower-level network device to cease functioning as the SDN sub-network controller.

6. The network controller of claim 4, wherein the network controller will not re-configure the particular lower-level network device to cease functioning as the SDN sub-network controller until after the network controller receives, from the particular lower-level network device, notice of termination of the communication session.

7. The network controller of claim 2, wherein the network controller learns about flows and traffic patterns in the network to (i) select the particular lower-level network device to perform sub-controller functionality and (ii) determine a duration for the particular lower-level network device to perform sub-controller functionality.

8. The network controller of claim 7, wherein the network controller performs artificial intelligence and/or machine learning to perform the learning, selection, and determination of claim 7.

9. The network controller of claim 1, wherein the network controller selects the particular lower-level network device as the lowest-level network device that can support the communication session.

10. The network controller of claim 9, wherein, in selecting the particular lower-level network device, the network controller takes into account one or more of (i) quality of service (QOS) requirements, (ii) link congestion, (iii) link cost, or (iv) network policy for the communication session.

11. The network controller of claim 1, wherein the network controller performs network function virtualization (NFV) functionality to determine that the subsequent phase of the communication session can be supported by the particular lower-level network device.

12. The network controller of claim 1, wherein:
the hierarchical communication network has two or more different lower network levels; and
the network controller is configured to determine that the subsequent phase of the communication session can be supported by the particular lower level network device in any of the two or more different lower network levels.

13. A method for a hierarchical communication network having a network controller at a highest network level and a plurality of network devices at one or more lower network levels, wherein each network device at a lowest network level is configured to support communications with one or more end nodes, the method comprising the network controller:
supporting an initial phase of a communication session between first and second end nodes of the network, wherein, for the initial phase, communication signals transmitted from the first end node to the second end node traverse the network controller;
determining that a subsequent phase of the communication session can be supported by a particular lower-level network device; and
configuring the lower-level network device to support the subsequent phase such that, for the subsequent phase, communication signals transmitted from the first end node to the second end node do not traverse the network controller.

14. The method of claim 13, wherein the network controller configures the particular lower-level network device to function as an SDN sub-network controller supporting the subsequent phase of the communication session.

15. The method of claim 14, wherein the particular lower-level network device is a router, switch, access point, or base station of the network that has sufficient unused processing and memory resources to function as the SDN sub-network controller in addition to performing its respective router, switch, access point, base station functionality.

16. The method of claim 14, wherein the network controller subsequently re-configures the particular lower-level network device to cease functioning as the SDN sub-network controller.

17. The method of claim 16, wherein the network controller takes into account one or more past and/or present communication sessions supported by the particular lower-level network device to determine when to re-configure the particular lower-level network device to cease functioning as the SDN sub-network controller.

18. The method of claim 16, wherein the network controller will not re-configure the particular lower-level network device to cease functioning as the SDN sub-network controller until after the network controller receives, from the particular lower-level network device, notice of termination of the communication session.

19. The method of claim 14, wherein the network controller learns about flows and traffic patterns in the network to (i) select the particular lower-level network device to perform sub-controller functionality and (ii) determine a duration for the particular lower-level network device to perform sub-controller functionality.

20. The method of claim 19, wherein the network controller performs artificial intelligence and/or machine learning to perform the learning, selection, and determination of claim 19.

21. The method of claim 13, wherein the network controller selects the particular lower-level network device as the lowest-level network device that can support the communication session.

22. The method of claim 21, wherein, in selecting the particular lower-level network device, the network controller takes into account one or more of (i) QoS requirements, (ii) link congestion, (iii) link cost, or (iv) network policy for the communication session.

23. The method of claim 13, wherein the network controller performs NFV functionality to determine that the subsequent phase of the communication session can be supported by the particular lower-level network device.

24. The method of claim 13, wherein:
the hierarchical communication network has two or more different lower network levels; and
the network controller is configured to determine that the subsequent phase of the communication session can be supported by the particular lower level network device in any of the two or more different lower network levels.

* * * * *